A. SINDING-LARSEN.
PROCESS FOR TRANSFORMING IRON SPONGE INTO SOLID IRON.
APPLICATION FILED MAR. 21, 1917.
1,306,928.
Patented June 17, 1919.
2 SHEETS—SHEET 1.
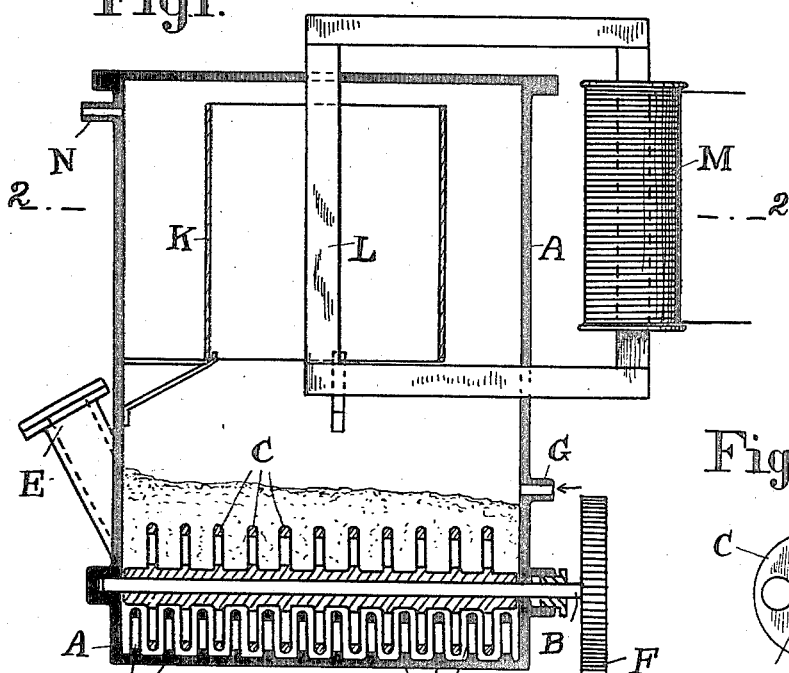
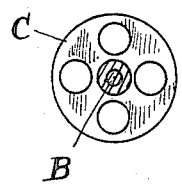
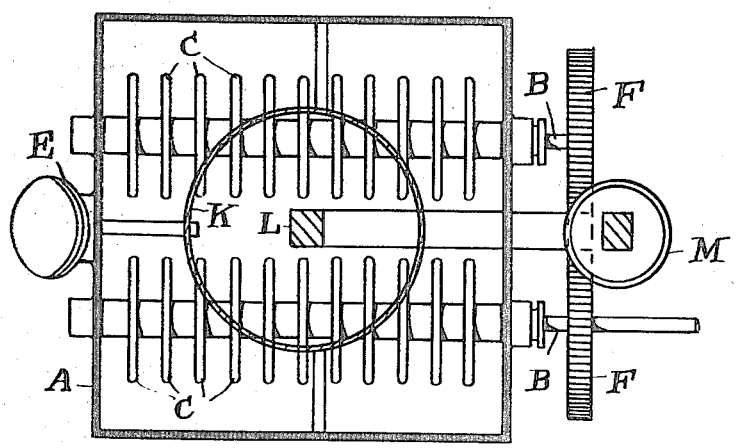
Inventor
Alf Sinding-Larsen
By Henry Orth
Atty

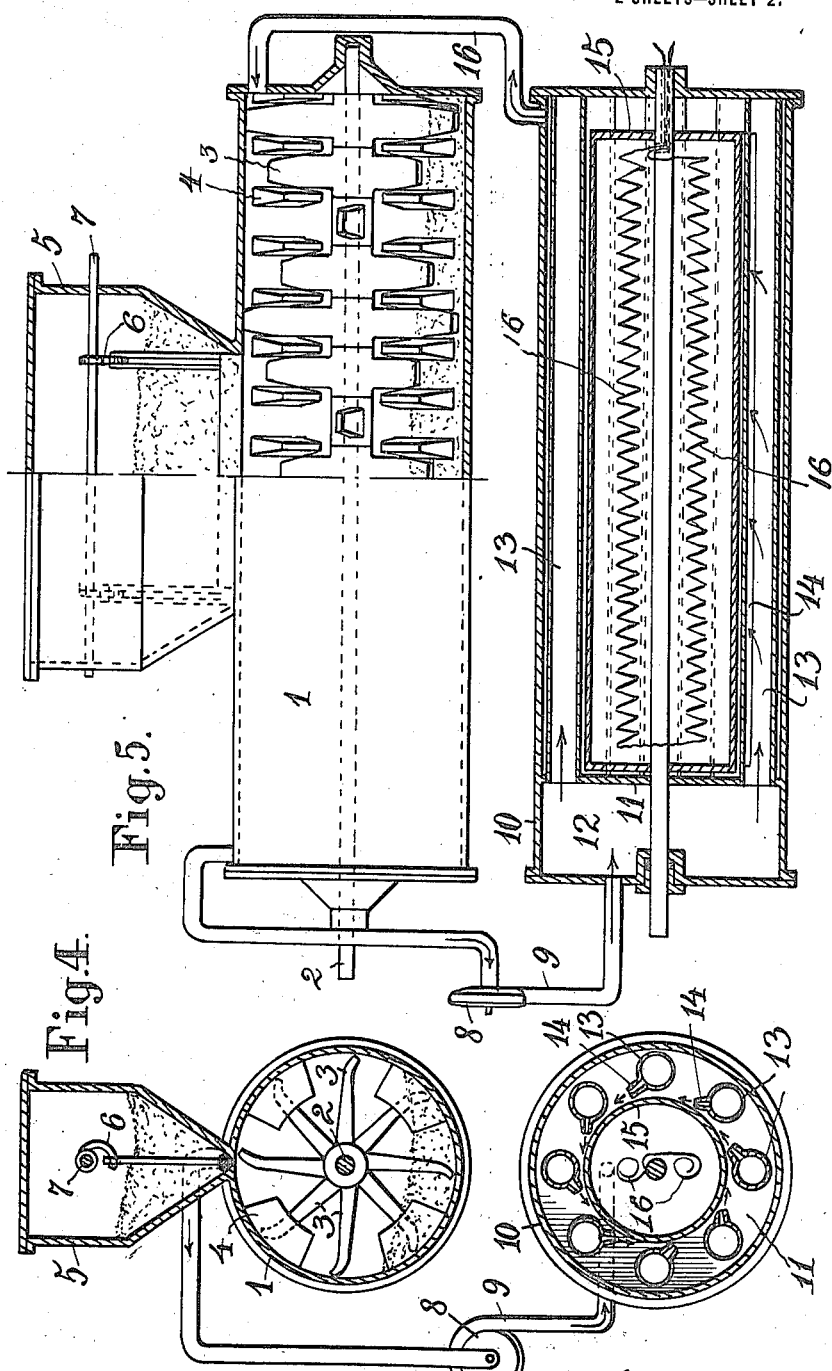

UNITED STATES PATENT OFFICE.

ALF SINDING-LARSEN, OF VESTRE AKER, NEAR CHRISTIANIA, NORWAY.

PROCESS FOR TRANSFORMING IRON SPONGE INTO SOLID IRON.

1,306,928.  Specification of Letters Patent.  Patented June 17, 1919.

Application filed March 21, 1917. Serial No. 156,505.

*To all whom it may concern:*

Be it known that I, ALF SINDING-LARSEN, a subject of the King of Norway, residing at Vestre Aker, near Christiania, Norway, have invented certain new and useful Improvements in Processes for Transforming Iron Sponge into Solid Iron; and I do hereby declare the following to be a full, clear, and exact description of the invention, such as will enable others skilled in the art to which it appertains to make and use the same.

My invention relates to the art of producing dense, compact iron from iron-sponge by first transforming the iron into iron-carbonyl and thereupon decomposing the carbonyl vapors, and the invention consists in certain steps and means whereby these processes are performed in a more perfect and economical manner than heretofore.

As well known iron produced at low temperature and in very finely divided state if heated with carbonmonoxid at about 100° centigrade can be transformed into iron-carbonyl, which latter compound at about 300° centigrade is decomposed into iron and carbon-monoxid.

These reactions, which may be used for transforming iron-sponge into dense, compact iron, have not, however, hitherto been carried out on an industrial scale, because experience shows that the formation of iron-carbonyl does not take place quantitatively; the reaction ceases when a certain comparatively small amount of iron has been transformed into iron-carbonyl.

My invention consists in a process whereby this drawback is overcome by combining the chemical process with a mechanical operation, I having observed that a rubbing or crushing of the iron-sponge during the reaction promotes the chemical reaction. This fact seems to be due to the circumstance that the surface of the iron particles become more or less passive during the chemical action of the carbon-monoxid. This passivity may be caused by oxidation, but it is thought that it is chiefly due to an absorption of the gases.

According to my invention I heat the iron-sponge to about 100° centigrade and simultaneously therewith submit the material to a rubbing or crushing action by suitable mechanical means, for instance a suitable mill and pass carbon monoxid through the mill during the disintegrating rubbing or crushing Another part of my invention relates to the treatment of the iron-carbonyl vapors for depositing therefrom the iron in solid form. For this purpose I make use of an electrical induction furnace in which the core or secondary member is formed by a freely suspended cylinder of thin iron or steelplate. If the primary winding of the induction furnace is supplied with a comparatively weak current, the aforesaid core will be heated to the temperature at which the iron-carbonyl is decomposed, and the iron will in this manner be deposited on the iron-core, while the carbon-monoxid liberated is carried back to the chamber where iron-carbonyl is formed, to be used over again.

If nickel-carbonyl is added to the iron-carbonyl in suitable quantity and heated in the induction furnace, nickel steel may be obtained.

If a carbureting of the iron is desired, this may be done in the induction furnace after the completion of the iron deposition, by raising the temperature and conducting hydro-carbons to the furnace-room.

Although I prefer to use an induction furnace as above described for the deposition of the iron, the decomposition of the iron-carbonyl may also be carried out by any other suitable means; and I may deposit the iron on nonmetallic bodies as porcelain, glass, etc., instead of on iron.

The above-described process may be carried out by means of an apparatus having the construction shown in the drawings, in which—

Figure 1 is a vertical section showing parts in elevation;

Fig. 2 a horizontal section of the apparatus taken on line 2—2 of Fig. 1, and

Fig. 3 is a detail.

Fig. 4 is a transverse section, and
Fig. 5 a longitudinal section of another form of apparatus.

In the lower part of the casing A, of insulating material, are mounted two rotatable shafts B each carrying a row of perforated disks C. On the bottom of the casing there are projections D entering between the said disks, and being also perforated. E is a chute through which the material to be heated is introduced. The two shafts B are provided with intermediate gearing F. When the shafts rotate the perforated disks will cause the granular material to be crushed and rubbed and simultaneously therewith it is exposed to the action of carbon monoxid introduced through the tube G. The required temperature of 100° centigrade may be obtained by placing the apparatus on a heated plate.

In the upper part of the apparatus is mounted a cylinder K of iron or steel plate serving as the secondary member of an electric induction heating apparatus, the magnet core of which is indicated at L, M being the primary winding.

The iron carbonyl formed in the lower part of the apparatus rises and passing inside and outside the cylinder K is heated to about 300° centigrade, whereupon iron is deposited on the cylinder; N is the outlet for the gases.

In the form of apparatus shown in Figs. 4 and 5, there are employed two separate containers, one for the treatment of the iron material with carbon monoxid and one for decomposing the iron carbonyl. The first named has the form of a cylinder 1, which is mounted on shaft 2, provided with arms 3 passing between projections 4 on the inside of the cylinder. The material is fed to the cylinder from the hopper 5 provided with a feeder 6 moved by the rock shaft 7. The carbonyl gases formed in the cylinder 1 are drawn therefrom by means of a centrifugal pump 8 and delivered to a pipe 9 connected to another cylinder 10. This cylinder 10 is divided by the wall 11 into two compartments, and the gases entering the compartment 12 are forced into the other compartment through a number of parallel tubes 13 arranged near the wall of the cylinder, each having a long slot 14 in a mouth-piece pointing inwardly in a somewhat tangential direction relatively to a rotating drum 15 of iron or steel plate. This drum is heated, for instance by way of an electrical resistance 16 mounted on the inside, and the carbonyl vapors blown against its outer surface will thereby be decomposed and iron will be deposited on the surface of the drum. The carbon monoxid passes from the lower cylinder 10 to the upper cylinder 1 through a pipe 16, and will carry sufficient heat to keep the temperature in the upper cylinder at the required height.

Claims:

1. A step in the method of transforming iron-sponge into dense metal, which comprises reacting upon iron-sponge during the rubbing or disintegration thereof with carbon mon-oxid at a temperature of about 100° centigrade.

2. The method of transforming iron sponge into dense metal, which comprises heating by induction a core in a closed chamber containing iron carbonyl to a temperature sufficient to decompose the iron carbonyl.

3. The method of manufacturing dense metal from iron sponge, which comprises suspending a sheet iron cylinder in a closed chamber containing iron carbonyl, said cylinder forming the secondary winding of an induction furnace, and passing current through the primary winding of said furnace to effect the heating of said cylinder sufficient to decompose the iron carbonyl contacting therewith.

4. The method of transforming iron sponge into dense metal, which comprises heating by induction a core in a closed chamber containing iron carbonyl to a temperature sufficient to decompose the iron carbonyl, and continuously agitating and rubbing the iron sponge in contact with the heated atmosphere of said chamber.

5. The method of transforming iron sponge into dense metal, which comprises heating by induction a core in a closed chamber containing iron carbonyl and nickel carbonyl to a temperature sufficient to decompose the carbonyls.

6. The method of manufacturing dense metal from iron sponge, which comprises suspending a sheet iron cylinder in a closed chamber containing iron and nickel carbonyls, said cylinder forming the secondary winding of an induction furnace, and passing current through the primary winding of said furnace to effect the heating of said cylinder sufficient to decompose the carbonyls contacting therewith.

7. In the art of producing iron, the method which comprises reacting upon iron sponge at a suitable temperature and while under abrasive action with carbon mon-oxid to produce iron carbonyl, decomposing the carbonyl by heat, returning the resulting carbon-mon-oxid into the cycle of operations and supplying carburizing material to the separated iron at a temperature suitable therefor.

8. In the art of producing iron, the method which comprises reacting upon iron sponge at a suitable temperature and while under abrasive action with carbon mon-oxid to produce iron carbonyl, adding thereto nickel carbonyl, decomposing the carbonyls by heat, returning the resulting carbon monoxid into the cycle of operations and supplying carburizing material to the separated iron at a temperature suitable therefor.

In testimony that I claim the foregoing as my invention, I have signed my name in presence of two subscribing witnesses.

ALF SINDING-LARSEN.

Witnesses:
C. NORMAN,
KARL L. LEE.